(12) United States Patent
Park et al.

(10) Patent No.: US 10,356,720 B2
(45) Date of Patent: Jul. 16, 2019

(54) DATA COMMUNICATION METHOD BETWEEN NAN DEVICES OPERATING IN POWER SAVE MODE AND DATA COMMUNICATION-PERFORMING NAN DEVICE OPERATING IN POWER SAVE MODE

(71) Applicant: LG ELECTRONICS INC., Seoul (KR)

(72) Inventors: Giwon Park, Seoul (KR); Dongcheol Kim, Seoul (KR); Byungjoo Lee, Seoul (KR); Hyunhee Park, Seoul (KR)

(73) Assignee: LG Electronics, Seoul (KR)

( * ) Notice: Subject to any disclaimer, the term of this patent is extended or adjusted under 35 U.S.C. 154(b) by 11 days.

(21) Appl. No.: 15/555,633

(22) PCT Filed: Dec. 9, 2015

(86) PCT No.: PCT/KR2015/013469
§ 371 (c)(1),
(2) Date: Sep. 5, 2017

(87) PCT Pub. No.: WO2016/140423
PCT Pub. Date: Sep. 9, 2016

(65) Prior Publication Data
US 2018/0049133 A1   Feb. 15, 2018

Related U.S. Application Data

(60) Provisional application No. 62/128,522, filed on Mar. 5, 2015.

(51) Int. Cl.
*H04W 52/02* (2009.01)
*H04W 8/00* (2009.01)
(Continued)

(52) U.S. Cl.
CPC ....... *H04W 52/0258* (2013.01); *H04W 8/005* (2013.01); *H04W 52/0216* (2013.01);
(Continued)

(58) Field of Classification Search
CPC ............ H04W 52/0258; H04W 8/005; H04W 52/0216; H04W 52/0219; H04W 52/0229;
(Continued)

(56) References Cited

U.S. PATENT DOCUMENTS

2009/0141692 A1   6/2009  Kasslin et al.
2013/0148642 A1   6/2013  Abraham et al.
(Continued)

FOREIGN PATENT DOCUMENTS

KR   10-2014-0021714 A   2/2014

*Primary Examiner* — Ajay Cattungal
(74) *Attorney, Agent, or Firm* — Dentons US LLP

(57) ABSTRACT

Disclosed are a data communication method between NAN devices operating in power save mode and a data communication-performing NAN device operating in power save mode. The data communication method between NAN devices operating in power save mode may comprise the steps of: a first NAN device receiving a discovery window cycle information element; on the basis of the window cycle information element, the first NAN device setting a discovery window cycle and a discovery window included in the discovery window cycle; the first NAN device operating on the discovery window in an awake state and receiving, from a second NAN device, a TIM information element containing information on data buffered on the first NAN device; and on the basis of the TIM information element, the first NAN device setting a listening window or a power save window within the discovery window cycle after the discovery window.

7 Claims, 15 Drawing Sheets

(51) Int. Cl.
*H04W 28/02* (2009.01)
*H04W 84/12* (2009.01)

(52) U.S. Cl.
CPC ... *H04W 52/0219* (2013.01); *H04W 52/0229* (2013.01); *H04W 28/02* (2013.01); *H04W 84/12* (2013.01); *Y02D 70/00* (2018.01); *Y02D 70/142* (2018.01); *Y02D 70/144* (2018.01); *Y02D 70/21* (2018.01); *Y02D 70/22* (2018.01)

(58) Field of Classification Search
CPC ...... H04W 28/02; H04W 84/12; Y02D 70/00; Y02D 70/142; Y02D 70/144; Y02D 70/21; Y02D 70/22
See application file for complete search history.

(56) References Cited

U.S. PATENT DOCUMENTS

| | | | | |
|---|---|---|---|---|
| 2014/0254426 A1 | 9/2014 | Abraham et al. | | |
| 2014/0321317 A1* | 10/2014 | Kasslin | ............... | H04W 4/08 370/254 |
| 2015/0036540 A1* | 2/2015 | Kasslin | ............... | H04W 48/18 370/254 |
| 2015/0200811 A1* | 7/2015 | Kasslin | ............... | H04L 41/12 370/254 |
| 2016/0014669 A1* | 1/2016 | Patil | ............... | H04W 40/246 370/329 |
| 2016/0014693 A1* | 1/2016 | Patil | ............... | H04L 12/1881 370/254 |
| 2016/0014694 A1* | 1/2016 | Patil | ............... | H04W 52/0219 370/254 |
| 2016/0014714 A1* | 1/2016 | Patil | ............... | H04L 5/0055 455/458 |
| 2016/0014715 A1* | 1/2016 | Patil | ............... | H04W 52/0216 370/329 |
| 2016/0088611 A1* | 3/2016 | Abraham | ............... | H04W 48/16 370/329 |
| 2016/0112984 A1* | 4/2016 | Patil | ............... | H04W 68/005 455/458 |
| 2016/0112986 A1* | 4/2016 | Patil | ............... | H04W 48/16 455/515 |
| 2016/0112987 A1* | 4/2016 | Patil | ............... | H04W 74/002 455/515 |
| 2016/0119894 A1* | 4/2016 | Patil | ............... | H04W 8/005 455/515 |
| 2016/0174136 A1* | 6/2016 | Patil | ............... | H04L 12/18 370/312 |
| 2016/0174219 A1* | 6/2016 | Patil | ............... | H04L 5/0055 370/329 |
| 2016/0174225 A1* | 6/2016 | Patil | ............... | H04W 68/005 370/329 |

\* cited by examiner

DATA COMMUNICATION METHOD BETWEEN NAN DEVICES OPERATING IN POWER SAVE MODE AND DATA COMMUNICATION-PERFORMING NAN DEVICE OPERATING IN POWER SAVE MODE

CROSS-REFERENCE TO RELATED APPLICATIONS

This application is the National Stage filing under 35 U.S.C. 371 of International Application No. PCT/KR2015/013469, filed on Dec. 9, 2015, which claims the benefit of U.S. Provisional Application No. 62/128,522 filed on Mar. 5, 2015, the contents of which are all hereby incorporated by reference herein in their entirety.

BACKGROUND OF THE INVENTION

Field of the Invention

The present invention relates to wireless communication and, most particularly, to a data communication method between neighbor awareness networking (NAN) devices operating in a power save mode and a data communication-performing NAN device operating in the power save mode.

Related Art

There is a growing demand for a proximity-based service for transmitting and receiving data between users in close proximity and application technologies based on the proximity-based service. Recently, with the explosive use of mobile Internet devices such as a smart phone, a tablet, or the like, there is a need for a device-to-device (D2D) communication technology which provides a new proximity-based service capable of guaranteeing a wider transmission range and a higher quality of service (QoS) than the conventional D2D communication technology such as Bluetooth or wireless fidelity (WiFi) peer to peer (P2P). The D2D communication technology may be utilized in various services such as commercial services, public safety related services, or the like.

WiFi Alliance (WFA) has been conducting research to support low power discovery between a plurality of terminals (or stations (STAs)) since 2011, and completed the draft specification 1.0 in May 2013. Unlike IEEE 802.11aq, the WFA supports mutual discovery between terminals without an access point (AP) in an independent basic service set (IBSS) environment of IEEE 802.11, and uses a synchronous-type protocol. Interworking with a WiFi P2P specification is taken into consideration in direct communication performed between terminals after the discovery between the terminals.

SUMMARY OF THE INVENTION

Technical Objects

An object of the present invention is to provide a data communication method between NAN devices operating in a power save mode.

Another object of the present invention is to provide a data communication-performing NAN device operating in a power save mode.

Technical Solutions

In order to achieve the above-described technical object of the present invention, according to an aspect of the present invention, a data communication method between neighbor awareness networking (NAN) devices operating in a power save mode may include the steps of receiving, by a first NAN device, a discovery window cycle information element, configuring, by the first NAN device, a discovery window cycle and a discovery window being included in the discovery window cycle based on the discovery window cycle information element, receiving, by the first NAN device, a traffic indication map (TIM) information element including information on buffered data for the first NAN device from a second NAN device, by having the first NAN device operate in an awake state during the discovery window, and configuring, by the first NAN device, a listening window or power save window within the discovery window cycle after the discovery window based on the TIM information element, wherein the discovery window cycle information element may include discovery window cycle information and discovery window information, wherein the discovery window cycle information may include information on a duration of an initial discovery window cycle, wherein the discovery window information may include information on a duration of the discovery window, and wherein a duration of the discovery window cycle may be determined as a multiple of the duration of the initial discovery window cycle in accordance with whether or not the TIM information element indicates the buffered data for the first NAN device.

In order to achieve the above-described technical object of the present invention, according to another aspect of the present invention, a first neighbor awareness networking (NAN) device operating in a power save mode including a radio frequency (RF) unit transmitting and/or receiving radio signals, and a processor being operatively connected to the RF unit, wherein the processor may be configured to receive a discovery window cycle information element, to configure a discovery window cycle and a discovery window being included in the discovery window cycle based on the discovery window cycle information element, to receive a traffic indication map (TIM) information element including information on buffered data for the first NAN device from a second NAN device, by having the first NAN device operate in an awake state during the discovery window, and to configure a listening window or power save window within the discovery window cycle after the discovery window based on the TIM information element, wherein the discovery window cycle information element may include discovery window cycle information and discovery window information, wherein the discovery window cycle information may include information on a duration of an initial discovery window cycle, wherein the discovery window information may include information on a duration of the discovery window, and wherein a duration of the discovery window cycle may be determined as a multiple of the duration of the initial discovery window cycle in accordance with whether or not the TIM information element indicates the buffered data for the first NAN device.

EFFECTS OF THE INVENTION

By operating the NAN device in a power save mode, the power of the NAN device performing NAN operations may be saved.

DESCRIPTION OF EXEMPLARY EMBODIMENTS

A neighbor awareness technology is under research in WiFi alliance (WFA). The neighbor awareness technology can discover a service for various applications by transmitting a small amount of messages while operating in a background mode in the STA.

When using the neighbor awareness technology, the STA may discover a neighbor service before connecting to a service providing device. After the service is discovered by using neighbor awareness networking (NAN), the STA may execute an application and connect to Wi-Fi Direct or the existing WLAN network to use a corresponding service.

The NAN needs to be designed to operate smoothly in crowded environments and indoors and to minimize power consumption. After the STA exchanges information on available services with other STAs through the NAN, the STA may opt-in a connection with a discovered STA. The STA and the discovered STA may be connected through a direct connection between devices.

Hereinafter, the STA or AP communicating based on the NAN may be expressed as a NAN terminal. In particular, among the NAN terminals, a NAN terminal which creates a NAN cluster may be expressed by the term "anchor master". At least one NAN terminal among NAN terminals included in the NAN cluster may be the NAN master.

Hereinafter, a neighbor awareness networking (NAN) topology is disclosed. A NAN network may consist of NAN terminals which use a set of the same NAN parameters (e.g., a time duration between consecutive discovery windows, a duration of a discovery window, a beacon interval, a NAN channel, or the like.). The NAN terminals may constitute a NAN cluster. The NAN cluster may be a set of NAN terminals which use a set of the same NAN parameters and operate in synchronization with the same discovery window schedule.

Figure 1:
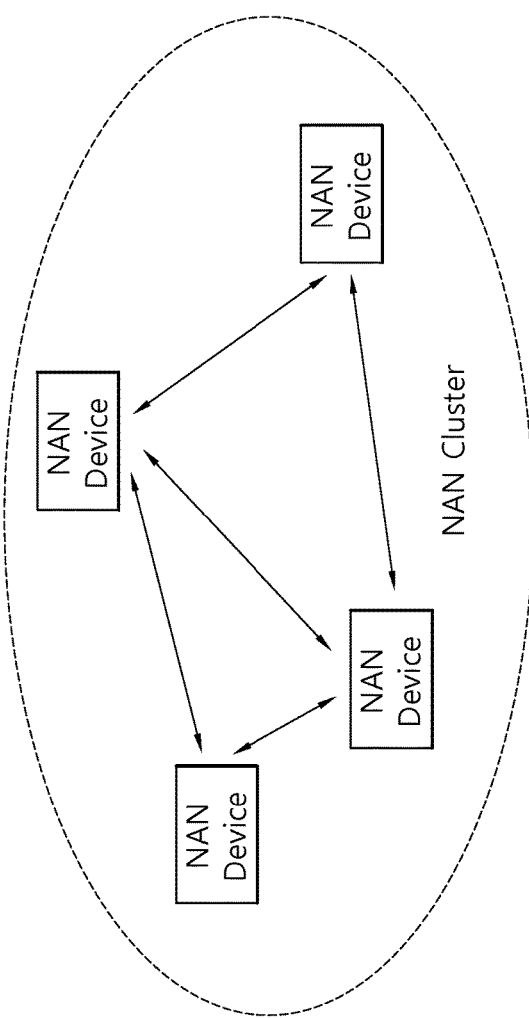
FIG. 1 and FIG. 2 are conceptual view illustrating a NAN cluster.
Figure 2:
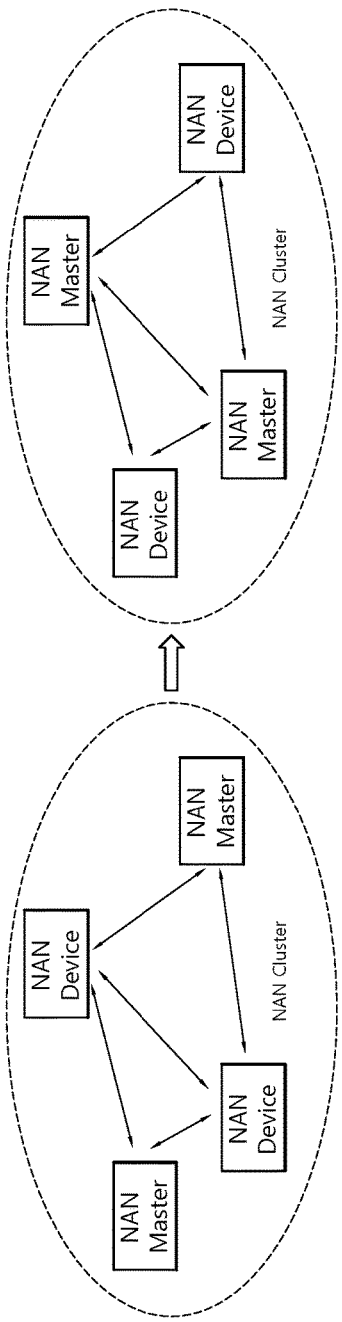

FIG. 1 and FIG. 2 are conceptual view illustrating a NAN cluster.

Referring to FIG. 1, a NAN terminal belonging to the NAN cluster may directly transmit a NAN service discovery frame in a multicast/unicast manner to another NAN terminal within a range of a discovery window.

Referring to FIG. 2, as described above, one or more NAN masters may be present in the NAN cluster, and the NAN master in the NAN cluster may be changed. In addition, the NAN master may transmit all of a NAN synchronization (or sync) beacon frame, a NAN discovery beacon frame, and a NAN service discovery frame.

The NAN sync beacon frame may be used for synchronization of NAN terminals in the NAN cluster. The NAN discovery beacon frame may be used for the purpose of advertising to NAN terminals which are not registered to the NAN cluster so that the cluster can be discovered. The NAN service discovery frame may be used for the purpose of exchanging information on a service between respective NAN terminals by advertising the service between the NAN terminals included in the NAN cluster.

Figure 3:
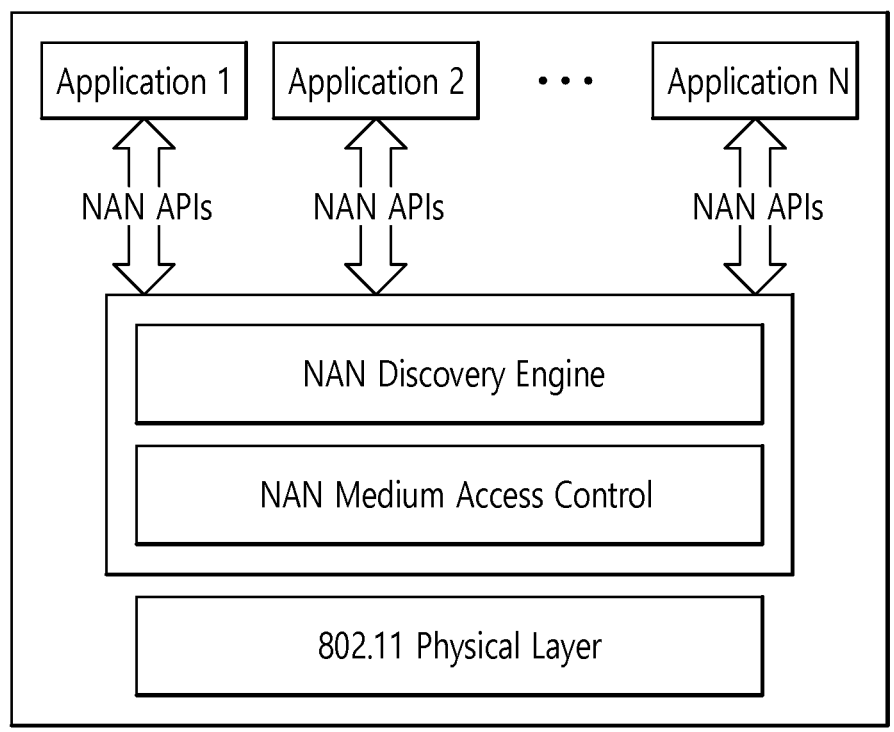
FIG. 3 is a conceptual view illustrating a structure of a NAN terminal.

FIG. 3 is a conceptual view illustrating a structure of a NAN terminal.

Referring to FIG. 3, the NAN terminal is based on the 802.11 physical layer, and has a NAN discovery engine, a NAN medium access control (MAC), and NAN application programming interfaces (APIs) towards respective applications (application 1, application 2, . . . , application N) as primary components.

Figure 4:
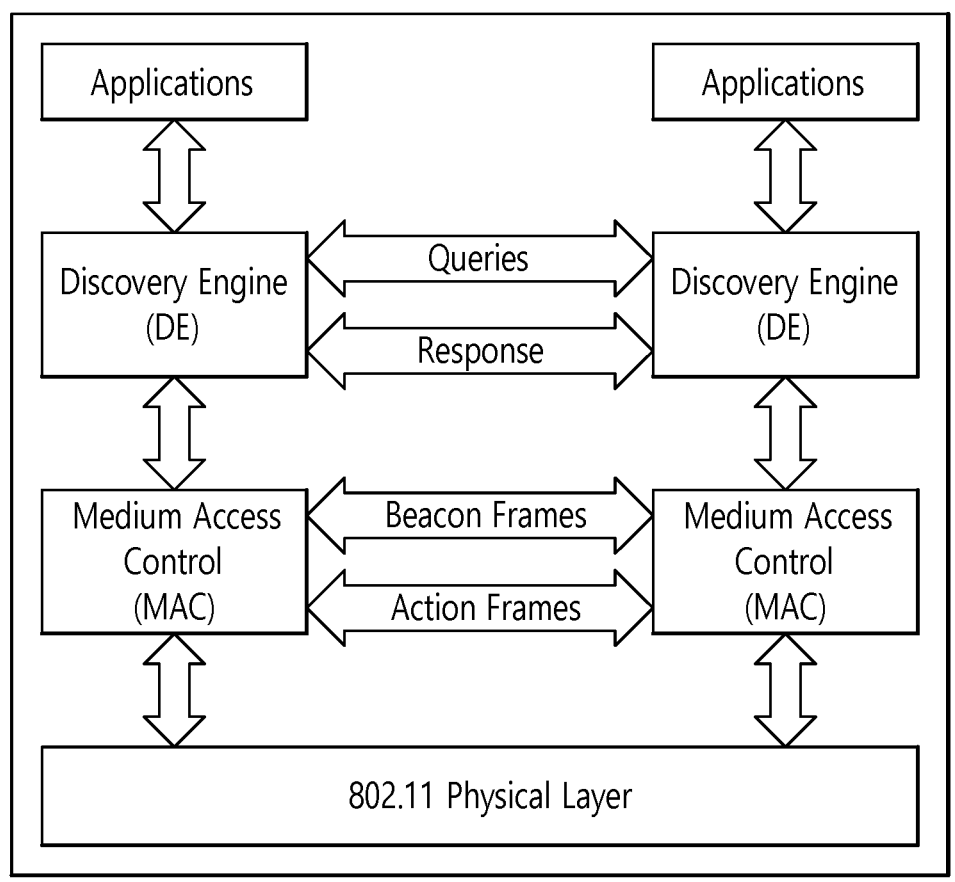
FIG. 4 and FIG. 5 are conceptual views illustrating a relationship between NAN components.
Figure 5:
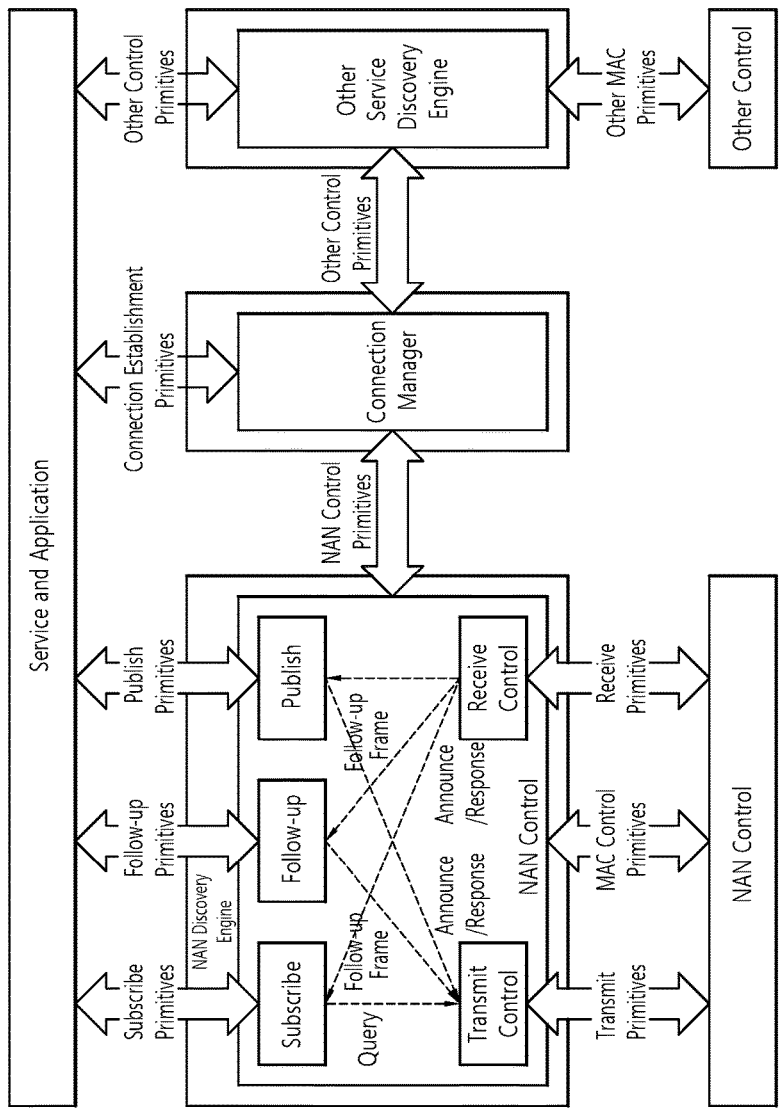

FIG. 4 and FIG. 5 are conceptual views illustrating a relationship between NAN components.

Referring to FIG. 4 and FIG. 5, a service request and response is pressed through a NAN discovery engine, and a NAN MAC processes NAN beacon frames and NAN service discovery frames. The NAN discovery engine may provide subscribe, publish, and follow-up functions.

The publish/subscribe function is performed through a service interface from a service/application. When a publish/subscribe command is executed, an instance of the publish/subscribe function is created. Each instance is driven independently, and several instances may be driven concurrently according to an implementation. The follow-up function is a means for a service/application for transmitting/receiving service-specific information.

Figure 6:
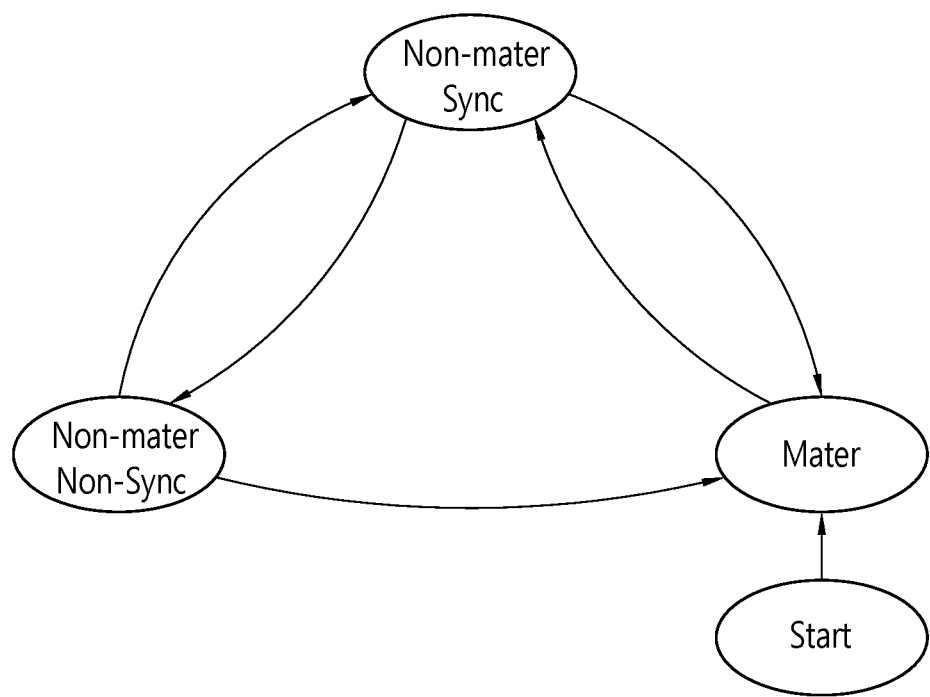
FIG. 6 is a conceptual view illustrating a role and state of a NAN terminal.

FIG. 6 is a conceptual view illustrating a role and state of a NAN terminal.

Referring to FIG. 6, the NAN terminal may operate as a NAN master for performing a master role. In addition, the role of the NAN master of the NAN terminal may be changed to another role. That is, the NAN terminal may transition to several roles and states.

The roles and states allowed for the NAN terminal may be a master (hereinafter, the master is a master role and sync state), a non-master sync, a non-master non-sync, or the like. According to the role and state of the NAN terminal, whether it is possible to transmit a NAN discovery beacon frame and/or a NAN sync beacon frame may be determined.

able 1 below shows whether it is possible to transmit the NAN discovery beacon frame and/or the NAN sync beacon frame according to the role and state of the NAN terminal.

TABLE 1

| Role and state | NAN discovery beacon frame | NAN synchronization beacon frame |
| --- | --- | --- |
| Master | transmission is possible | transmission is possible |
| Non-Master Sync | transmission is impossible | transmission is possible |
| Non-Master Non-Sync | transmission is impossible | transmission is impossible |

The state of the NAN terminal may be determined through a master rank. The master rank represents an intention of a NAN terminal which intends to operate as a NAN master. That is, a master rank having a great value represents a high preference for the NAN master of the NAN terminal. According to a master preference, a random factor, and a device MAC address, a NAN MR may be determined by Equation 1 described below.

$$\text{MasterRank} = \text{MasterPreference} \times 2^{56} \text{Randomfactor} \times 2^{56} + \text{MAC}[5] \times 2^{40} + \ldots + \text{MAC}[0] \qquad \text{<Equation 1>}$$

The master preference, the random factor, and the device MAC address may be indicated based on a master indication attribute included in the NAN beacon frame. The master indication attribute may be as shown in Table 2 below.

TABLE 2

| Field Name | Size | Value | Description |
| --- | --- | --- | --- |
| Attribute ID | 1 | 0 × 00 | Identifies the type of NAN attribute |
| Length | 2 | 2 | Length of the following field in the attribute |
| Master Preference | 1 | 0-255 | Information that is used to indicate a NAN Device preference to serve as the role of Master, with a larger value indicating a higher preference |
| Random Factor | 1 | 0-255 | A random number selected by the sending NAN Device |

In regards to the master rank, the NAN terminal which activates the NAN service and starts the NAN cluster sets both of the master preference and the random factor to 0, and resets NANWarmUp. The NAN terminal shall set a value of the master preference in the master indication attribute to a value greater than 0 and set a value of the random factor in the master indication attribute to a new value until the NANWarmUp expires.

The NAN terminal joined to the NAN cluster having the master preference of the NAN master set to a value greater than 0 may set the master preference to a value greater than 0 regardless of whether the NANWarmUp expires, and may set the random factor to a new value.

The NAN terminal may operate as the NAN master of the NAN cluster according to the value of the master rank. That is, all NAN terminals included in the NAN cluster have capability to operate as the NAN master. The NAN master has the greatest master rank in the NAN cluster. Further, the NAN master has a value of 0 as an HC (Hop count to the Anchor Master) value. The NAN master may have the smallest AMBTT (Anchor Master Beacon Transmit Time) value among the NAN terminals included in the NAN cluster.

A plurality of NAN masters may be present temporarily in the NAN cluster. However, in principle, one NAN master may be present in the NAN cluster. A NAN terminal which becomes a NAN master in the pre-existing NAN cluster may directly use a time synchronization function (TSF) used in the pre-existing NAN cluster.

The NAN terminal may start a new NAN cluster, or the NAN terminal may become a NAN master according to a change in the master rank. Alternatively, if a beacon frame is no longer received from another NAN terminal currently operating as the NAN master, the NAN terminal may become the NAN master. In addition, if a received signal strength indication (RSSI) of other NAN terminals among the NAN terminals belonging to the NAN cluster is decreased to be less than or equal to a specific level, the NAN terminal may autonomously become the NAN master. NAN terminals participating in the same NAN cluster may be synchronized to a common clock. The TSF of the NAN cluster may be implemented by a distributed algorithm which must be performed in all NAN terminals. Each NAN terminal participating in the NAN cluster may transmit NAN sync beacon frames according to the distributed algorithm.

The NAN terminal may synchronize a clock during a discovery window. The discovery window has a length of 16 Time Units (TUs). During the discovery window, one or more NAN terminals may transmit synchronization beacon frames to help all NAN terminals in the NAN cluster to synchronize the clock.

The NAN sync beacon frame is transmitted in a dispersive manner. The NAN sync beacon frame may be transmitted in a discovery window duration which exists every 512 TUs. All NAN terminals may participate in the creation and transmission of the NAN sync beacon frame according to the role and state of the device. Each NAN terminal shall maintain its own TSF timer used for NAN beacon cycle timing.

The transmission duration of the NAN sync beacon frame may be set by the NAN terminal which creates the NAN cluster. A series of target beacon transmission times (TBTTs) is defined such that the discovery window duration capable of transmitting the NAN sync beacon frame is separated exactly by 512 TUs. A time 0 is defined as a first TBTT, and a discovery window starts at each TBTT.

Each NAN terminal playing a role of the NAN master may transmit the NAN discovery beacon frame in a duration other than the NAN discovery window. On average, the NAN master may transmit the NAN discovery beacon frame every 100 TUs. A time between successive NAN discovery beacons transmitted by one NAN master is less than or equal to 200 TUs.

If a scheduled transmission time of the NAN discovery beacon frame overlaps with the NAN discovery window duration of the NAN cluster, the NAN master may skip transmission of the NAN discovery beacon frame. To minimize power for transmission of the NAN discovery beacon frame, the NAN master may transmit the NAN discovery beacon frame in a contention-based manner on the basis of a channel access parameter corresponding to AC (access category)_VO (voice).

In addition, the NAN terminal may transmit the NAN service discovery frame within the discovery window duration. The NAN service discovery frame may be transmitted by all NAN terminals. That is, the NAN terminal transmits a NAN service discovery frame and/or a synchronous beacon frame in a contention-based manner between a start (TStartDW) point of the discovery window and an end point (TEndDW) of the discovery window. If the NAN terminal is in a master or non-master sync state, the NAN service discovery frame and the NAN sync beacon frame may all be transmitted in the same discovery window.

Figure 7:
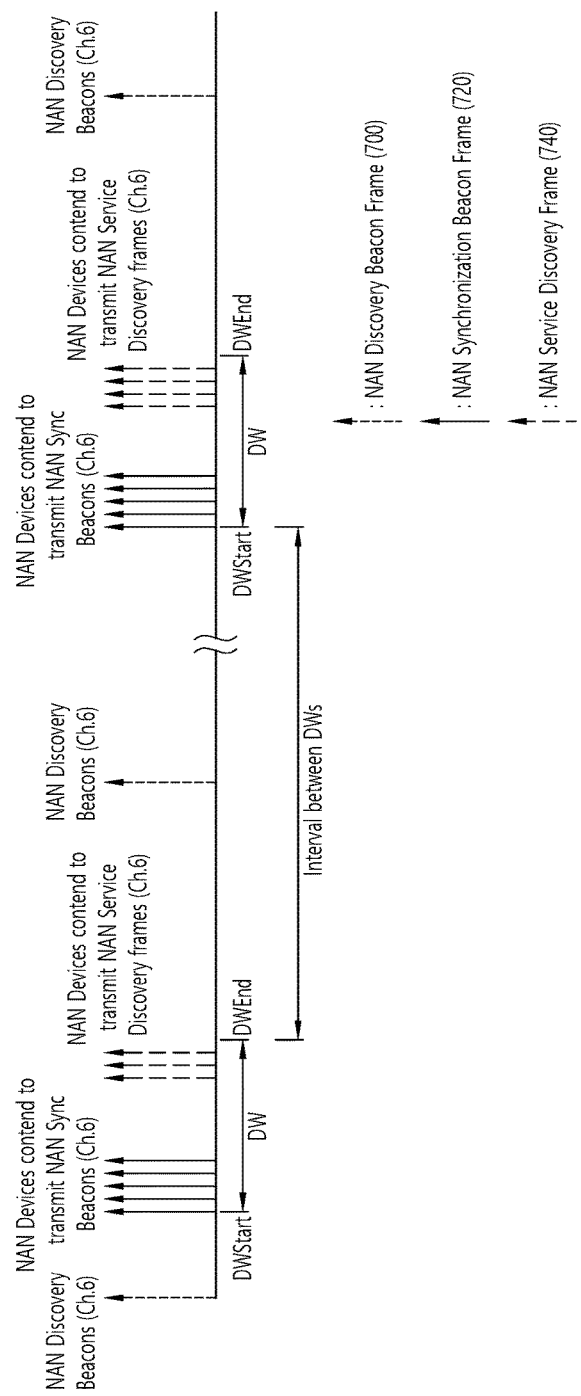
FIG. 7 is a conceptual view illustrating a frame transmission operation of a NAN device.

FIG. 7 is a conceptual view illustrating a frame transmission operation of a NAN device.

FIG. 7 discloses a method of the NAN device for transmitting a NAN synchronization (sync) beacon frame, a NAN service discovery frame, and a NAN discovery beacon frame.

Referring to FIG. 7, the NAN device may be shifted to an awake state at an interval of 512 ms and may transmit a NAN service discovery frame 740 and a NAN sync beacon frame 720 to another NAN device during a discovery window section of 16 ms.

Also, the NAN device may transmit a NAN discovery beacon frame 700 between discovery window sections. More specifically, each NAN device performing the role of a NAN master may transmit the NAN discovery beacon frame 700 during a section excluding the NAN discovery window. On average, the NAN master may transmit the NAN discovery beacon frame 700 at intervals of 100 ms. A time period between contiguous NAN discovery beacon frames 700, which are transmitted by on NAN master, may be set to 200 ms or less.

As described above in Table 1, the transmission or the non-transmission of the NAN discovery beacon frame 700 and/or the NAN sync beacon frame 720 may be determined in accordance with the role and state of the NAN device.

Hereinafter, the NAN discovery beacon frame 700 may also be expressed by using the term discovery beacon frame, the NAN sync beacon frame 720 may also be expressed by using the term sync beacon frame, and the NAN service discovery frame 740 may also be expressed by using the term service discovery frame.

Hereinafter, this exemplary embodiment of the present invention discloses a power saving operation of the NAN device. The NAN device performing the power saving operation may reduce power consumption by shifting to and from a doze state and an awake state. The NAN device operating in the doze state is incapable of performing transmission and reception of frames, and the NAN device operating in the awake state may be capable of performing transmission and reception of frames. In case the NAN device is shifted from the awake state to the doze state, power consumption may be reduced.

Figure 8:
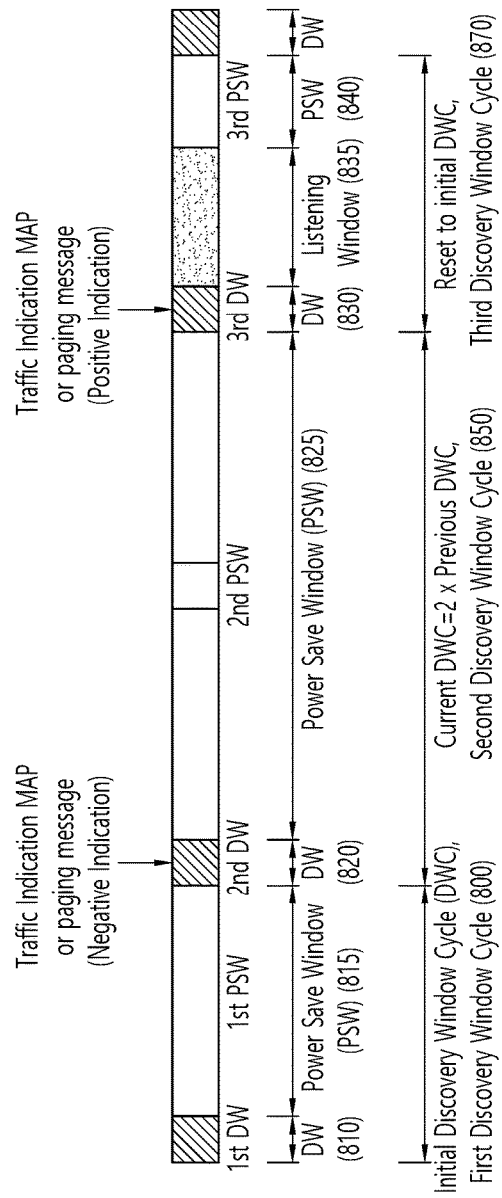
FIG. 8 is a conceptual view illustrating an operation method of a NAN device performing power save operations according to an exemplary embodiment of the present invention.

FIG. 8 is a conceptual view illustrating an operation method of a NAN device performing power save operations according to an exemplary embodiment of the present invention.

FIG. 8 discloses a time section being defined for a NAN device performing power saving operations. In the present invention, the time section may be defined as described below in order to allow the NAN device to effectively operate in the power saving mode.

A discovery window (DW) may correspond to a time section during which a service discovery frame and a sync beacon frame, which are transmitted by another NAN device, can be received. In another perspective, the discovery window may correspond to a time section during which a service discovery frame and a sync beacon frame may be transmitted to another NAN device. Herein, the discovery window may be defined to be equal to 16 ms. During the time section corresponding to the discovery window, the NAN device may operate in the awake state.

As a time section being defined stating from the current discovery window, a discovery window cycle may correspond to a time section up to before the beginning of the next discovery window.

A power save window may correspond to a time section during which the NAN device operates in the doze state. The power save window may correspond to a section excluding the discovery window during the discovery window cycle.

Alternatively, the power save window may correspond to a section excluding the discovery window and a listening window during the discovery window cycle. In case data that are to be received by the NAN device during the discovery window cycle exist, a listening window for the data reception of the NAN device may be configured after the discovery window. In this case, the size of the power save window may be reduced in accordance with an increase in the size of the listening window. In case data that are to be received by the NAN device during the discovery window cycle do not exist, the listening window may not be configured, and the power save window may be configured after the discovery window.

More specifically, in case traffic indication map (TIM) information, which is transmitted during the discovery window, does not indicate that buffered data for the NAN device exist in another NAN device, a section after the discovery window may be configured as the power save window, and, after the discovery window, the NAN device may be immediately shifted to the doze state. More specifically, the power save window may be defined as a discovery window cycle-discovery window. Also, the discovery window cycle may be defined as a power save window+discovery window.

Conversely, in case the TIM information, which is transmitted during the discovery window, indicates that buffered data for the NAN device exist in another NAN device, the listening window may be configured after the discovery window, and, after the listening window is completed (or ended), the time section until the next discovery window may be configured as the power save window. More specifically, the power save window may be defined as a discovery window cycle-(listening window+discovery window). Additionally, the discovery widow cycle may be defined as a power save window+listening window+discovery window.

As described above, the listening window may correspond to a section during which the NAN device transmits and receives a frame, such as control frame/management frame/data frame, and so on, to and from another NAN device after the discovery window while maintaining the awake state. The listening window may be configured in a case when the TIM information, which is transmitted during the discovery window, indicates that buffered data for the NAN device exist in another device.

An initial discovery window cycle may correspond to a discovery window cycle, which is initially configured after a subscription of the NAN device to a NAN cluster. Alternatively, the initial discovery window cycle may also indicate a discovery window cycle that is reset ad reduced after a discovery window cycle, which was increased due to a negative indication on the NAN device included in the TIM information element. The initial discovery window cycle may also be expressed by using the term default discovery window cycle.

A current discovery window cycle may correspond to a discovery window cycle, which is configured starting from after the initial discovery window cycle. The current discovery window cycle may be used as a term for expressing a current discovery window cycle that allows the NAN device to transmit or receive a service discovery frame/sync beacon frame, after the initial discovery window cycle.

Referring to FIG. 8, the initial discovery window cycle (or first discovery window cycle) 800 may start from a first discovery window 810. A time section corresponding to the first discovery window 810 may be equal to 16 ms. In case a separate frame is not transmitted from the first discovery window 810, which is included in the first discovery window cycle 800, a first power save window 815 may be configured after the first discovery window 810. Alternatively, in case a frame including a TIM information element, which is received during the first discovery window 810 included in the first discovery window cycle 800, or a frame including paging information does not indicate the presence of the buffered data for the NAN device, the power save window 815 may be configured as the first discovery window 810. During the first power save window 815, the NAN device may shift to the doze state and may then reduce power consumption.

The frame including the TIM information element or the frame including the paging information (or paging message) may correspond to a service discovery frame, a beacon sync frame, or a separately defined frame. The TIM information element may include an indication map (or bitmap) indicating the presence or absence (or existence or non-existence) of buffered data for the NAN device based on identification information of the NAN device. Each bit configuring the indication map may indicate information on the presence or absence of buffered data for each of the plurality of NAN devices. In case a specific bit corresponds to a positive indication (e.g., 1), this may indicate the presence (or existence) of the buffered data for the NAN device corresponding to the specific bit. Conversely, in case a specific bit corresponds to a negative indication (e.g., 0), this may indicate the absence (or non-existence) of the buffered data for the NAN device corresponding to the specific bit.

Similarly, the paging information may include information on the presence or absence of buffered data for the NAN device, or the paging information may trigger the transmission of the frame that requests buffered data, such as a PS-poll frame of the corresponding NAN device.

Hereinafter, for simplicity in the description of the exemplary embodiment of the present invention, the frame indicating the presence or absence of buffered data for the NAN device will be expressed as a TIM frame, and an information element indicating the presence or absence of buffered data for the NAN device or an information element triggering the transmission of a PS-poll frame will be expressed as a TIM information element.

According to the exemplary embodiment of the present invention, information on a duration of the first discovery window cycle (or the initial discovery window cycle or default discovery window cycle) 800 may be transmitted by being included in a service discovery frame, a sync beacon frame, or a discovery beacon frame. Based on the information on the duration of the first discovery window cycle 900, which is transmitted by being included in a service discovery frame, a sync beacon frame, or a discovery beacon frame, a starting point of the discovery window cycle of each of the plurality of NAN devices being included in the same cluster may be equally configured. For example, the duration of the first discovery window cycle (or the initial discovery window cycle or default discovery window cycle) 800 may be set to be equal to 512 ms. Accordingly, each of the plurality of NAN devices included in the NAN cluster may be synchronized to one another so as to start its discovery window cycle at the same start point.

Also, information on the duration of the discovery window may be transmitted by being included in a service discovery frame, a sync beacon frame, or a discovery beacon frame. The duration of the discovery window may also be configured by the service discovery frame, the sync beacon frame, or the discovery beacon frame.

During a second discovery window 820 included in a second discovery window cycle 850, the NAN device may shift from a doze state to an awake state and may then receive information on the buffered data for the NAN device through the TIM frame. In case the TIM information element included in the TIM frame indicates the absence (or non-existence) of buffered data for the NAN device, a time section after the second discovery window 820 included in the second discovery window cycle 850 may be configured as a second power save window 825, and, then, the NAN device may shift back to the doze state during the second power save window 825. In other words, in case a bit corresponding to the NAN device, which is included in the TIM information element included in the TIM frame, corresponds to a negative indication, a time section after the second discovery window 820 included in the second discovery window 850 may be configured as the second power save window 825, and, then, the NAN device may shift back to the doze state during the second power save window 825.

A length of a discovery window cycle (or a length of a power save window within the discovery window cycle) may vary. For example, in case the NAN device receives a negative indicator through the TIM information element during the second discovery window 820, the second discovery window cycle 850 including the second discovery window 820 may be increased. For example, in case the TIM information element, which is received during the second discovery window 820, includes a negative indicator for the NAN device, a time section corresponding to the second discovery window cycle 850 may be two times the length of the time section corresponding to the first discovery window cycle (or initial discovery window cycle or default discovery window cycle) 800.

Additionally, in case the NAN device receives a negative indicator for the NAN device through the TIM information element during a third discovery window 830, which is included in a third discovery window cycle 870, a time section corresponding to the third discovery window cycle 870 may be four times the length of the time section corresponding to the first discovery window cycle 800 (or two times the length of the time section corresponding to the second discovery window cycle 850). FIG. 8 only illustrates a case when a positive indicator for the NAN device is received through the TIM information element during the third discovery window 830, which is included in the third discovery window cycle 870.

More specifically, the time section corresponding to the discovery window cycle may be increased in accordance with an increase in a number of consecutive receptions of negative indicators performed by the NAN device through the TIM information element during the discovery window. The above-described increase in the time section of the discovery window cycle may also be applied to the initial discovery window cycle.

The increase in the time section corresponding to the discovery window cycle in accordance with the increase in the number of receptions of negative indicators may be limited to within a maximum duration of a discovery window cycle.

Information on a maximum duration of a discovery window cycle may be transmitted by being included in a service discovery frame, a sync beacon frame, or a discovery beacon frame. Therefore, NAN devices included in the same NAN cluster may operate during a maximum duration of equally configured discovery window cycles. Also, start timing (or start times) of the discovery windows corresponding to each of the plurality of NAN devices, which are included in the same NAN cluster, may be equally configured.

In case the TIM information element, which is received by the NAN device after the third discovery window 830, includes a positive indicator for the NAN device, the size of an increased discovery window cycle may be reduced (or reset) back to the size of the initial discovery window cycle (or default discovery window cycle). More specifically, the size of the third discovery window cycle 870 may be configured to be equal to the size of the initial discovery window cycle.

In case the TIM information element, which is received by the NAN device after the third discovery window 830, includes a positive indicator for the NAN device, a listening window 835 may be configured after the third discovery window 830. In case the listening window 835 is configured, the size of the configured section of a third power save window 840 included in the third discovery window cycle 870 may be reduced to as much as a configured section of the listening window 835. The NAN device may transmit and/or receive data during the listening window 835, and, then, in case the transmission and/or reception of the data is completed, the NAN device may configure the remaining time section within the third discovery window cycle 870 as the third power save window 840 and may then shift to the doze state.

In case the duration of the listening window 835 becomes longer, instead of configuring the third power save window 840 during the third discovery window cycle 870, the third discovery window cycle 870 may include only the third discovery window 830 and the listening window 835. Moreover, in case the transmission and/or reception of the data is not completed during the listening window, which is configured within one discovery window cycle, a time section after a discovery window included in a next discovery window cycle may be configured as the listening window. And, then, the transmission and/or reception of the data may be resumed.

Figure 9:
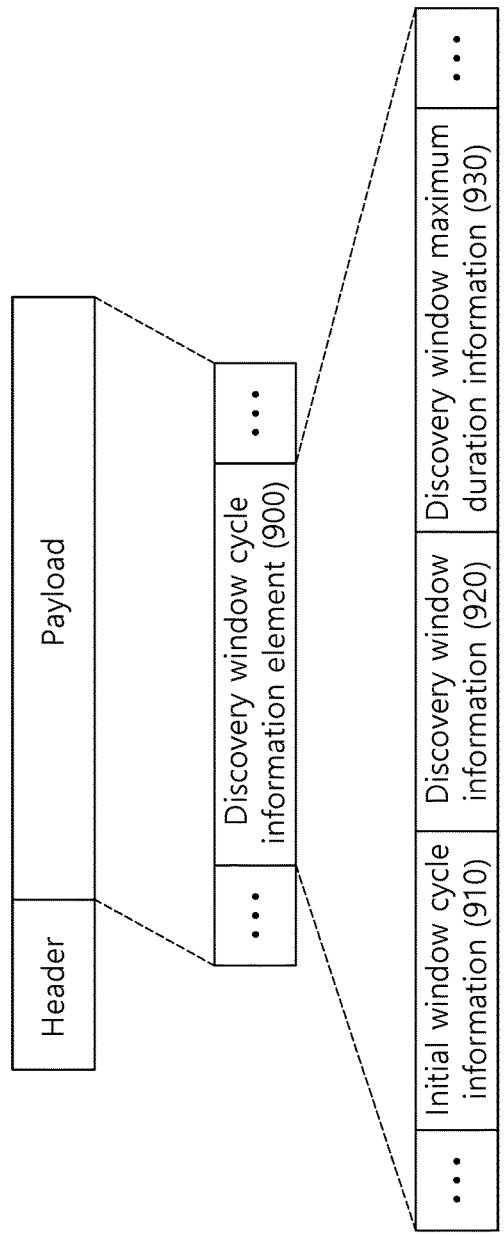
FIG. 9 is a conceptual view illustrating a frame including an information element that is defined for data communication between NAN devices according to an exemplary embodiment of the present invention.

FIG. 9 is a conceptual view illustrating a frame including an information element that is defined for data communication between NAN devices according to an exemplary embodiment of the present invention.

FIG. 9 discloses a discovery window cycle information element 900, which is defined for data communication between NAN devices.

Referring to FIG. 9, the discovery window cycle information element 900 may be transmitted by being included in a service discovery frame, a sync beacon frame, or a discovery beacon frame.

The discovery window cycle information element 900 may include initial discovery window cycle information 910, discovery window information 920, and discovery window cycle maximum duration information 930.

The initial discovery window cycle information 910 may include information on a duration of an initial discovery window cycle (or default discovery window cycle). After subscribing to a NAN cluster, the NAN device may operate during a discovery window cycle, which is configured based on the information on the initial discovery window cycle.

The discovery window information 920 may include information on a duration of a discovery window, which is included in the discovery window cycle. After subscribing to the NAN cluster, the NAN device may operate during a discovery window cycle, which is configured based on the information on the initial discovery window cycle and the discovery window information.

The discovery window cycle maximum duration information 930 may include information on a maximum duration of a discovery window cycle. As described above, the duration of a discovery window cycle of a NAN device may be increased in accordance with whether or not the TIM element information indicates a negative indicator for the NAN device. The NAN device may increase the discovery window cycle only up to the maximum duration of the configured discovery window cycle based on the discovery window cycle maximum duration information.

Figure 10:
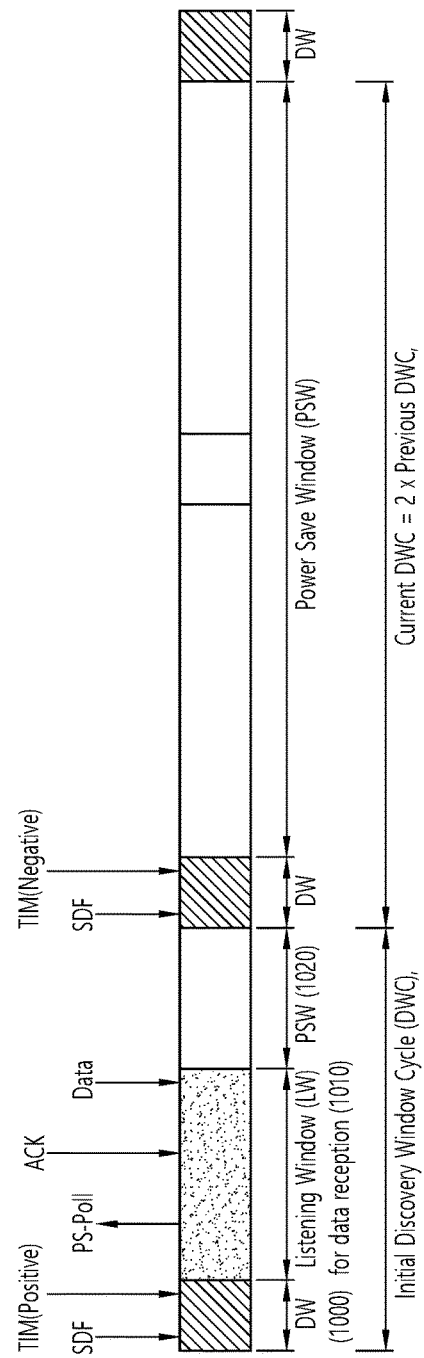
FIG. 10 is a conceptual view illustrating an operation method of a NAN device performing power save operations according to an exemplary embodiment of the present invention.

FIG. 10 is a conceptual view illustrating an operation method of a NAN device performing power save operations according to an exemplary embodiment of the present invention.

FIG. 10 discloses operations of the NAN device during the listening window.

Referring to FIG. 10, the NAN device may receive a TIM information element including a positive indicator for the NAN device during a discovery window 1000 of the initial discovery window cycle.

In this case, the NAN device may configure a listening window 1010 after the discovery window 1000 and may then transmit a power save (PS)-poll frame during the listening window 1010. The PS-poll frame may be transmitted for requesting transmission of data that are buffered for the NAN device to another NAN device (or for polling data transmission). In order to request the transmission of data, another frame other than the PS-poll frame may be used, and such frame for requesting the transmission of data may also be expressed by using the terms data polling frame, data trigger frame, and so on.

The other NAN device, which includes data that are buffered for the NAN device having transmitted the TIM information element, may receive a PS-poll frame and may transmit an acknowledgement (ACK) frame as a response to the PS-poll frame. After transmitting the ACK frame, the other NAN device may transmit a data frame including data that are buffered for the NAN device to the NAN device. Alternatively, the other NAN device may transmit a data frame, which include the data that are buffered for the NAN device, to the NAN device without having to separately transmit an ACK frame.

In case the NAN device completes the procedure(s) for transmitting and/or receiving data during the listening window 1010, which is configured in one discovery window cycle, the NAN device may configure the remaining section as the power save window 1020 and may then shift to the doze state.

Conversely, in case the NAN device does not complete the procedure(s) for transmitting and/or receiving data during the listening window 1010, which is configured in one discovery window cycle, the power save window 1020 is not configured in one discovery window cycle, and a section after the discovery window may be configured as the listening window. The NAN device that has failed to complete the procedure(s) for transmitting and/or receiving data may resume the data transmission and/or reception procedure(s) through the listening window, which is configured after the discovery window during the next discovery window cycle.

Figure 11:
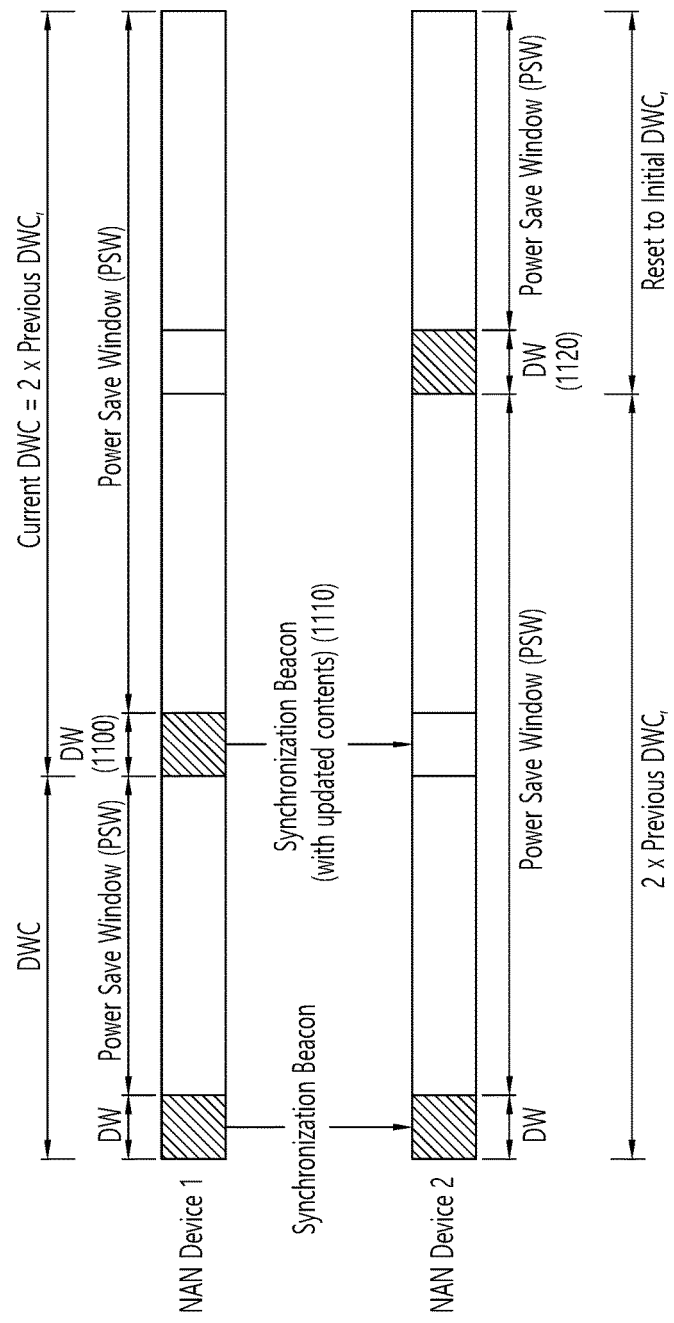
FIG. 11 is a conceptual view illustrating problems caused by the power save mode of a NAN device according to an exemplary embodiment of the present invention.

FIG. 11 is a conceptual view illustrating problems caused by the power save mode of a NAN device according to an exemplary embodiment of the present invention.

FIG. 11 discloses synchronization problems that occur in the NAN device operating in the power save mode.

Referring to FIG. 11, the NAN device1, which is included in the NAN cluster, may transmit a sync beacon frame 1110 including updated parameters (or information). The sync beacon frame 1110 may be transmitted by a Master NAN device or a Non-Master Sync NAN device. NAN device1 may correspond to a Master NAN device or a NAN-Master Sync NAN device, and NAN device2 may correspond to a Non-Master Non-Sync NAN device.

In case the NAN device2 is shifted to the doze state during the discovery window 1100, during which the sync beacon frame 1110 is transmitted by the NAN device1, due to the increased discovery window cycle, the NAN device2 may not be capable of receiving the sync beacon frame 1110, which includes the updated information.

Additionally, even though the NAN device2 is shifted to the awake state during a discovery window 1120 of a next discovery window cycle, if the NAN device1 is shifted to the doze state due to the increased discovery window cycle, the NAN device2 may not be capable of receiving once again the sync beacon frame, which includes the updated information.

In this case, the NAN device2 may perform NAN operations based on the sync beacon frame 1110, which includes non-updated information that is transmitted before being updated.

Operations of the NAN device for resolving the above-described problems are defined in the exemplary embodiment of the present invention.

Figure 12:
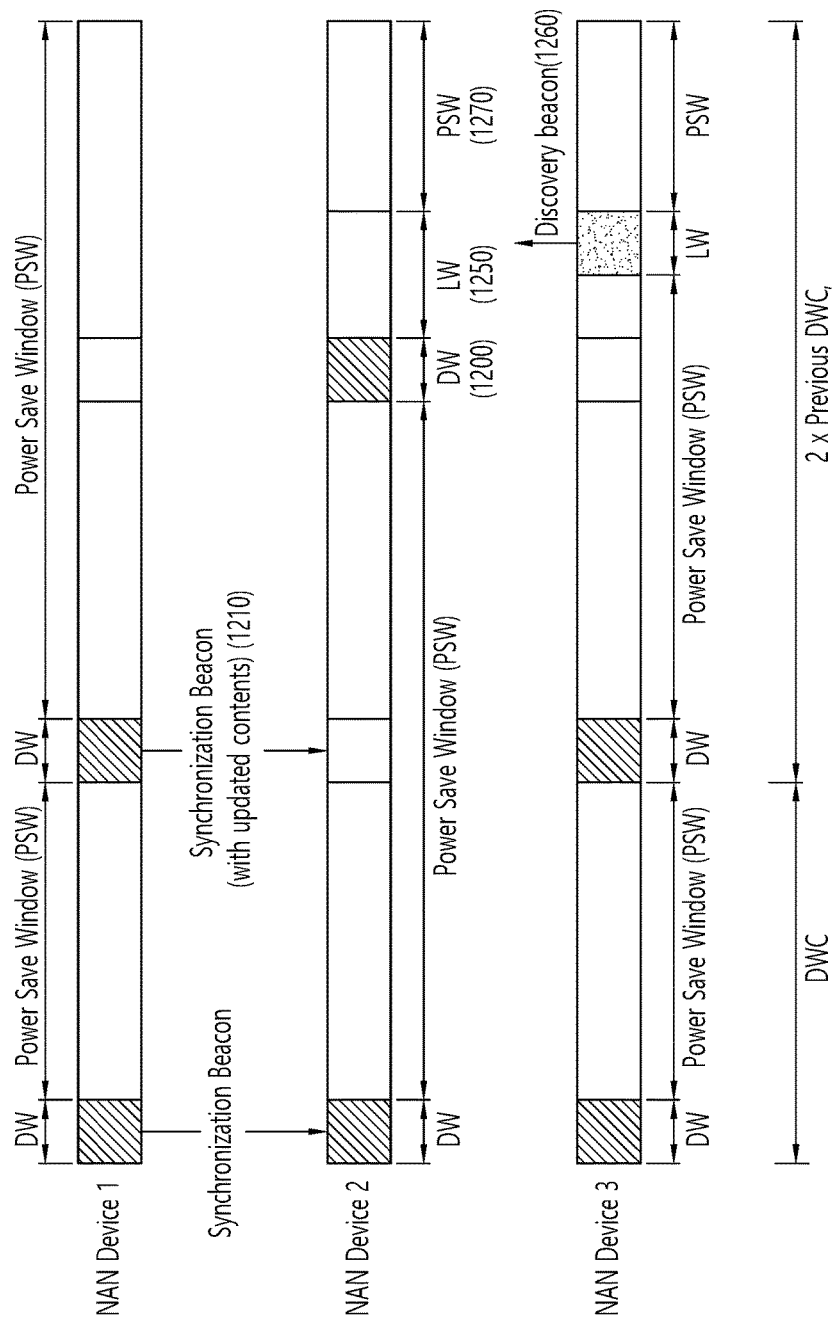
FIG. 12 is a conceptual view illustrating operations of a NAN device according to an exemplary embodiment of the present invention.

FIG. 12 is a conceptual view illustrating operations of a NAN device according to an exemplary embodiment of the present invention.

FIG. 12 discloses operations of the NAN device for enhancing problems of failing to receive updated information from another NAN device due to the shift of the NAN device to the doze state.

Referring to FIG. 12, the NAN device2 is shifted to the doze state during the power save window, and, accordingly, the NAN device2 is incapable of receiving a sync beacon frame 1210, which includes updated information being transmitted from the NAN device1. NAN device1 may correspond to a Master NAN device or a Non-Master Sync NAN device, NAN device2 may correspond to a Non-Master Non-Sync NAN device, and NAN device3 may correspond to a Master NAN device.

The NAN device2 may be shifted to the awake state during a discovery window 1200 in a next discovery window cycle and may then monitor the reception of a sync beacon frame. However, the NAN device1/NAN device3 maintains the doze state during the discovery window 1200 of a next discovery window cycle. Accordingly, the NAN device2 is incapable of receiving the sync beacon frame 1210, which includes the updated information.

Therefore, according to the exemplary embodiment of the present invention, in case the NAN device fails to receive the sync beacon frame 1210 during the discovery window 1200, the NAN device may configure a section after the discovery window 1200 section as a listening window 1250 section and may, then, receive a discovery beacon frame 1260 being transmitted from another NAN device. In case the NAN device receives the discovery beacon frame 1260 during the configured listening window 1250 section, the NAN device may configure the remaining section as a power save window and may then be shifted to the doze state. The discovery beacon frame 1260 may also include updated information (or updated system information).

For example, in case the NAN device2 fails to receive the sync beacon frame 1210 from the NAN device1/NAN device3 during the discovery window 1200, the NAN device2 may configure a listening window 1250, thereby being capable of monitoring the transmission of the discovery beacon frame 1260, which is transmitted from the NAN device1/NAN device3. The NAN device2 may receive the discovery beacon frame 1260 that is transmitted from the NAN device3, which corresponds to a Master NAN device. Thereafter, the NAN device2 may configure the remaining section that follows as a power save window 1270 and may then be shifted to the doze state. The discovery beacon frame 1260 may also include updated information, and the NAN device2 may perform NAN operations that are based on the updated information included in the discovery beacon frame 1260.

Figure 13:
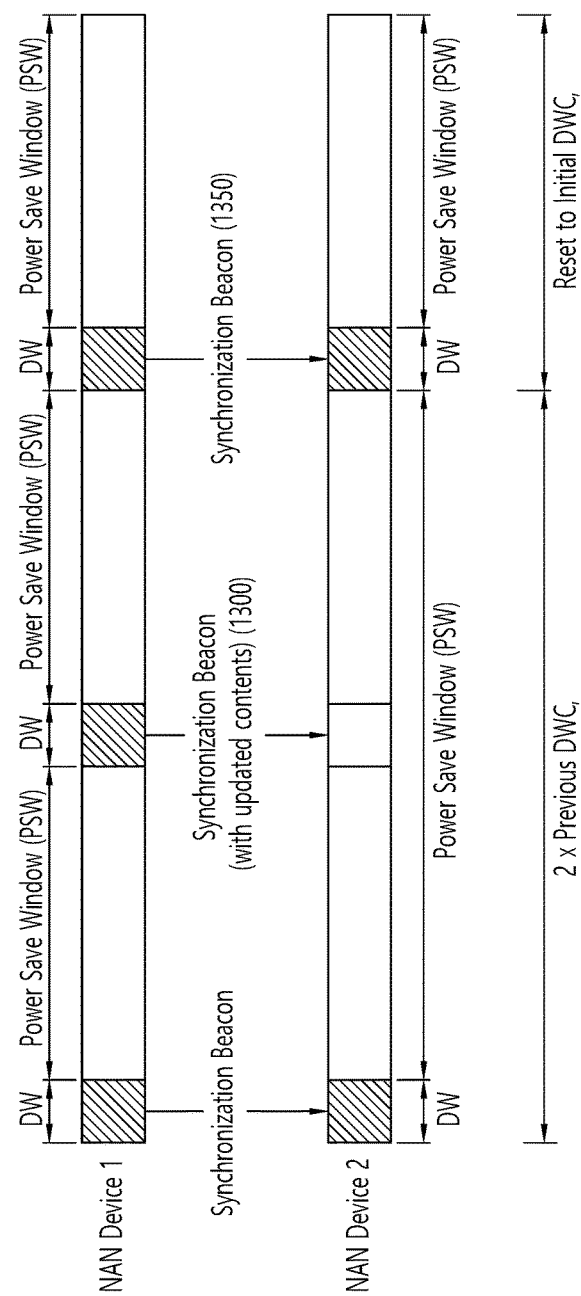
FIG. 13 is a conceptual view illustrating operations of a NAN device according to an exemplary embodiment of the present invention.

FIG. 13 is a conceptual view illustrating operations of a NAN device according to an exemplary embodiment of the present invention.

FIG. 13 discloses a method performed by the NAN device for verifying updated information when operating during a discovery window cycle of the NAN device.

Referring to FIG. 13, a case when the NAN device1, which is included in one NAN cluster, transmits a sync beacon frame including updated information is disclosed. NAN device1 may correspond to a Master NAN device or a Non-Master Sync NAN device. And, NAN device2 may correspond to a Non-Master Non-Sync NAN device.

When the NAN device1 transmits the sync beacon frame during a first discovery window of a first discovery window cycle, the NAN device2 may be in a doze state. The NAN device2 operating in the doze sate is incapable of receiving a sync beacon frame 1300, which is transmitted from the NAN device1.

The NAN device2 is shifted to the awake state during a second discovery window of a next second discovery window cycle, thereby being capable of receiving a service discovery frame/sync beacon frame 1350 from another NAN device. At this point, in case the NAN device2 receives the sync beacon frame 1350 from the NAN device1, the NAN device2 is required to verify whether or not updated information is included in the received sync beacon frame.

Therefore, according to the exemplary embodiment of the present invention, the service discovery frame/sync beacon frame may include information indicating whether or not the updated information is included therein. For example, the service discovery frame/sync beacon frame may include a configuration change count, wherein each time a configuration change occurs, the configuration change is counted and the configuration is changed accordingly.

More specifically, in case updated information is included in the service discovery frame/sync beacon frame, the configuration change count may be incremented by 1, and, after the count is incremented up to a predetermined size (or level), the configuration change count may reset to 0 and may then continue to be incremented. The configuration change count may be configured as a value that is incremented only in a case when a critical update has occurred.

The NAN device2 performs a comparison between a configuration change count value included in a previously received service discovery frame/sync beacon frame and a configuration change count value included in a newly received service discovery frame/sync beacon frame, so as to verify whether or not updated information exists.

In case the updated information exists, the NAN device2 may perform NAN operations by applying the updated information, which is included in the newly received service discovery frame/sync beacon frame.

Figure 14:
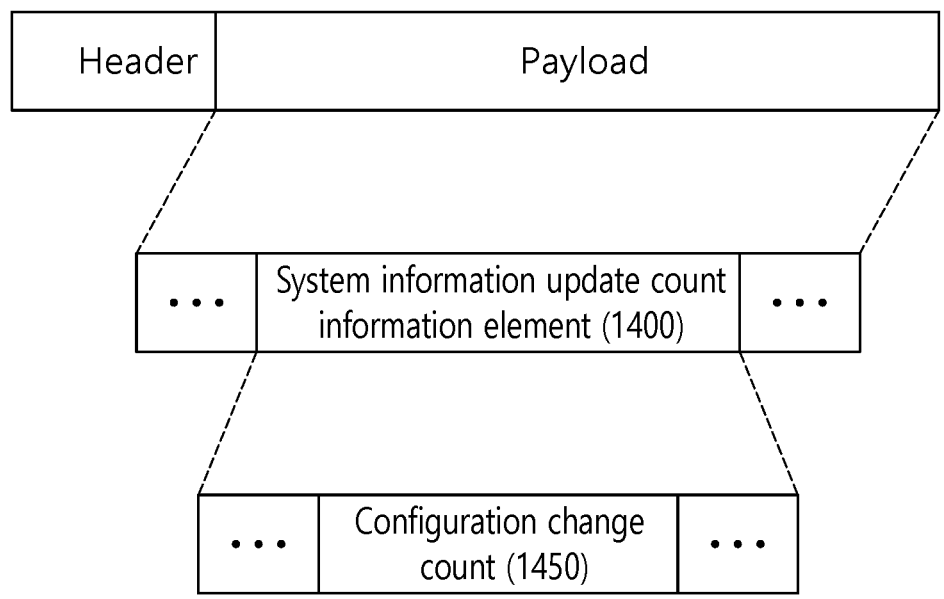
FIG. 14 is a conceptual view illustrating a frame including an information element that is defined for data communication between NAN devices according to an exemplary embodiment of the present invention.

FIG. 14 is a conceptual view illustrating a frame including an information element that is defined for data communication between NAN devices according to an exemplary embodiment of the present invention.

FIG. 14 discloses a system information update count information element 1400, which is defined for data communication between NAN devices.

The system information update count information element 1400 may be included in a service discovery frame/sync beacon frame/discovery beacon frame, and so on. The system information update count information element 1400 may indicate whether or not updated information is included in the frame.

For example, the system information update count information element 1400 may include a configuration change count 1450. The configuration change count 1450 may include count information for indicating a change in parameter content that is included in the frame.

In case the parameter (or information) included in the frame is updated, the count value may be incremented. In case a parameter included in the frame is updated, the count value may be unconditionally updated. And, only in a case when a critical parameter (or critical information) is updated, among the parameters included in the frame, the count value may be incremented. The critical parameter (or information) may correspond to a required parameter (or information) that is needed for changing the NAN operation of the NAN device receiving the frame.

The value of the configuration change count 1450 may be incremented within a range of 0 to 15, and, in case the value of the configuration change count exceeds 15, the configuration change count value may be reset to 0.

Additionally, in case the NAN device withdraws from its NAN cluster, the NAN device may reset the count value that is cached in the corresponding NAN device.

Figure 15:
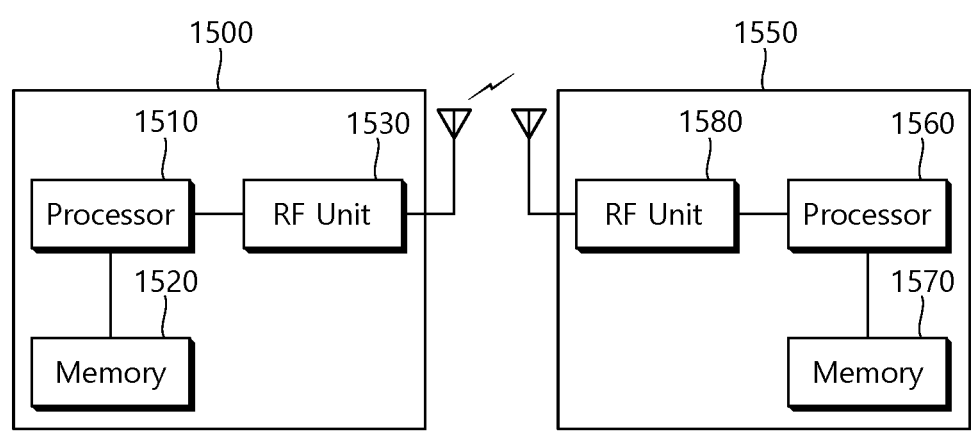
FIG. 15 is a block view illustrating a wireless device to which the exemplary embodiment of the present invention can be applied.

FIG. 15 is a block view illustrating a wireless device to which the exemplary embodiment of the present invention can be applied.

Referring to FIG. 15, a first NAN device 1500 includes a processor 1510, a memory 1520, and a radio frequency (RF) unit 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be implemented to perform the operations of the first NAN device according to the above-described exemplary embodiments of the present invention. The processor may be configured to perform the operations of the first NAN device, which are disclosed in the exemplary embodiments of FIG. 1 to FIG. 14.

For example, the processor 1510 may be configured to receive a discovery window cycle information element and to configure a discovery window cycle and a discovery window that is included in the discovery window cycle based on the received discovery window cycle information element.

Also, the processor 1510 may be configured to be operated in an awake state during a discovery window, so as to receive a traffic indication map (TIM) information element including buffered data for the first NAN device from the second NAN device, and to configure a listening window or a power save window in the discovery window cycle after the discovery window based on the received TIM information element.

The discovery window cycle information element may include discovery window cycle information and discovery window information, the discovery window cycle information may include information on a duration of an initial discovery window cycle, and the discovery window information may include information on a duration of a discovery window. The duration of a discovery window cycle may be determined as a multiple of the duration of the initial discovery window cycle in accordance with whether or not the TIM information element indicates the presence of buffered data for the first NAN device.

A listening window may be configured in case the TIM information element indicates the presence of data being buffered for the first NAN device, and a power save window may be configured in case the TIM information element does not indicate the presence of data being buffered for the first NAN device. The listening window may correspond to a time section that maintains the awake state during which the first NAN device is capable of transmitting or receiving a frame, and the power save window may correspond to a time section shifting the first NAN device to the doze state during which the first NAN device is incapable of transmitting or receiving a frame.

The duration of the listening window may be configured in accordance with a time section for the transmission of the buffered data, and, in case the transmission of the buffered data cannot be completed during the listening window section and the remaining buffered data are pending to the second NAN device, a section after a discovery window being included in a next discovery window, which is subsequent to the current discovery window cycle, may be configured as an additional listening window. Accordingly, the remaining buffered data may be transmitted to the first NAN device through the additional listening window.

A second NAN device 1550 includes a processor 1560, a memory 1570, and a radio frequency (RF) unit 1580.

The RF unit 1580 is connected to the processor 1560, thereby being capable of transmitting and/or receiving radio signals.

The processor 1560 implements the functions, processes, and/or methods proposed in the present invention. For example, the processor 1560 may be implemented to perform the operations of the second NAN device (NAN device2) according to the above-described exemplary embodiments of the present invention. The processor 1560 may perform the operations of the NAN device, which are disclosed in the exemplary embodiments of FIG. 1 to FIG. 14.

For example, the processor 1560 may be configured to transmit a sync beacon frame, a service discovery frame, or a discovery beacon frame including a discovery window cycle information element.

Also, the processor 1560 may be configured to receive a PS-poll frame, which is transmitted from the first NAN device, and to transmit data that are buffered for the first NAN device to the first NAN device as a response to the received PS-poll frame.

The processor 1510 and 1560 may include an application-specific integrated circuit (ASIC), another chip set, a logical circuit, a data processing device, and/or a converter converting a baseband signal and a radio signal to and from one another. The memory 1520 and 1570 may include a read-only memory (ROM), a random access memory (RAM), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

What is claimed is:

1. A data communication method between neighbor awareness networking (NAN) devices operating in a power save mode, comprising:
   receiving, by a first NAN device in an awake state, first traffic indication map (TIM) information related to an existence of first buffered data for the first NAN device from a second NAN device during a discovery window (DW);
   determining, by the first NAN device, that there is the first buffered data for the first NAN device based on the first TIM information;
   updating, by the first NAN device, a discovery window cycle (DWC) based on the first TIM information, wherein the DWC is related to a variable time interval between the DW and a subsequent DW;
   changing, by the first NAN device, from the awake state to a doze state when the DW has elapsed;
   maintaining, by the first NAN device, the doze state based on the updated DWC until the subsequent DW;
   changing, by the first NAN device, from the doze state to the awake state when the subsequent DW begins; and
   receiving, by the first NAN device in the awake state, second TIM information related to a presence of second buffered data for the first NAN device from the second NAN device during the subsequent DW.

2. The method of claim 1, wherein a duration of the DWC is configured to be within a range of a predetermined maximum duration.

3. The method of claim 1, wherein an initial time length for the DWC is predetermined, and
   wherein the updated DWC is set to N times the initial time length when the first TIM information includes information for notifying an absence of the first buffered data.

4. The method of claim 3, further comprising:
   receiving, by the first NAN device, the second buffered data from the second NAN device during a listening window when the second TIM information includes information for notifying a presence of the second buffered data,
   wherein the listening window is related to a predetermined time interval immediately following the subsequent DW, and
   wherein the updated DWC is reset to the initial time length.

5. A first neighbor awareness networking (NAN) device operating in a power save mode, comprising:
   a radio frequency (RF) unit transmitting and/or receiving radio signals; and
   a processor being operatively connected to the RF unit, wherein the processor is configured:
   to receive first traffic indication map (TIM) information related to an existence of first buffered data for the first NAN device from a second NAN device during a discovery window (DW),
   to determine that there is the first buffered data for the first NAN device based on the first TIM information,
   to update a discovery window cycle (DWC) based on the first TIM information,
   wherein the DWC is related to a variable time interval between the DW and a subsequent DW,
   to change from the awake state to a doze state when the DW has elapsed,
   to maintain the doze state based on the updated DWC until the subsequent DW,
   to change from the doze state to the awake state when the subsequent DW begins, and
   to receive second TIM information related to a presence of second buffered data for the first NAN device from the second NAN device during the subsequent DW.

6. The device of claim 5,
   wherein an initial time length for the DWC is predetermined, and
   wherein the updated DWC is set to N times the initial time length when the first TIM information includes information for notifying an absence of the first buffered data.

7. The device of claim 6, wherein the processor is further configured:
   to receive the second buffered data from the second NAN device during a listening window when the second TIM information includes information for notifying a presence of the second buffered data,
   wherein the listening window is related to a predetermined time interval immediately following the subsequent DW, and
   wherein the updated DWC is reset to the initial time length.

* * * * *